Patented Apr. 2, 1935

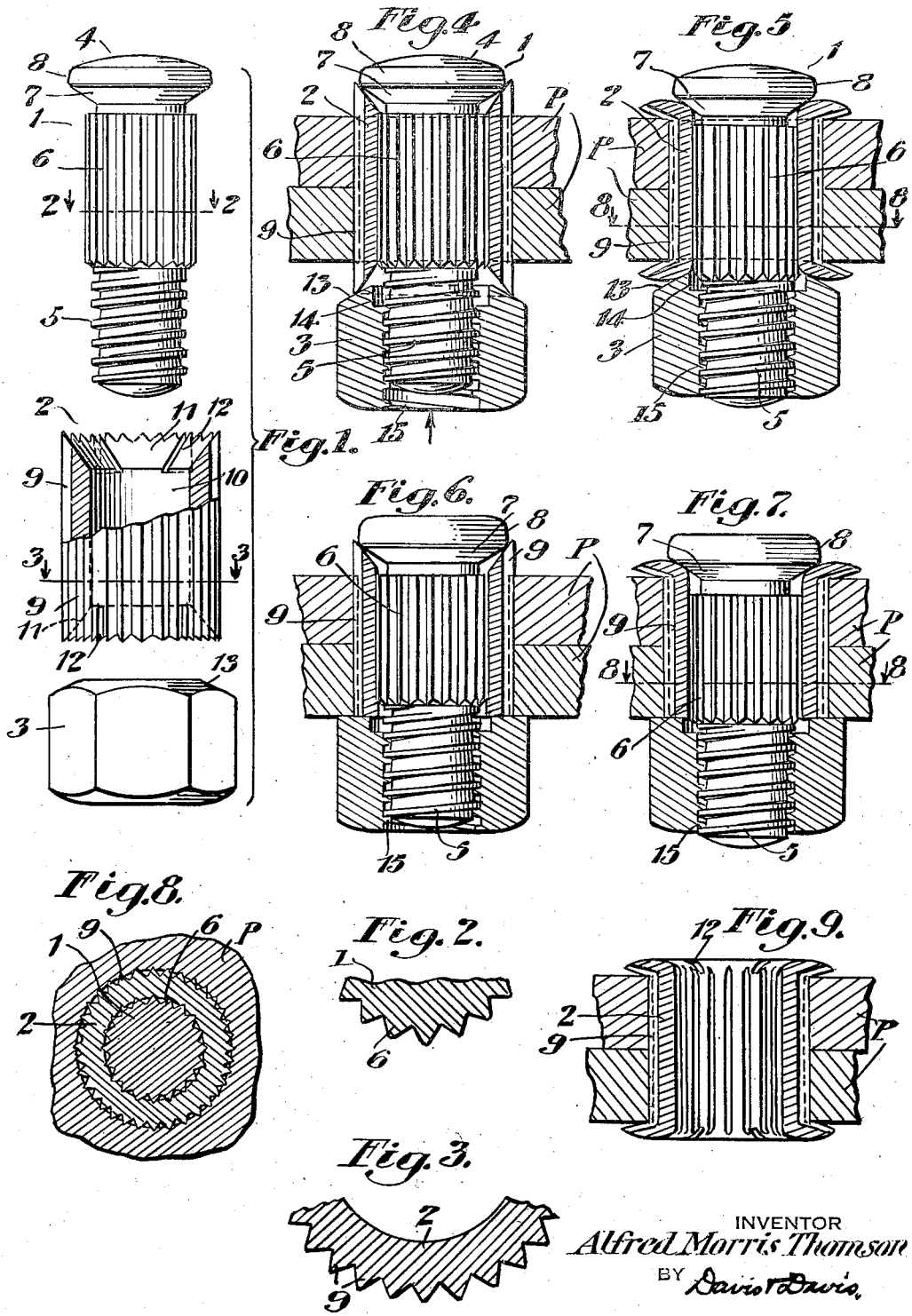
April 2, 1935. A. M. THOMSON 1,996,128
FASTENER
Filed Nov. 21, 1933

1,996,128

UNITED STATES PATENT OFFICE 1,996,128

FASTENER

Alfred Morris Thomson, East Orange, N. J., assignor to Dardelet Threadlock Corporation, New York, N. Y., a corporation of Delaware Application November 21, 1933, Serial No. 698,950

9 Claims. (Cl. 85—2)

This invention relates more particularly to an expansible fastener of the type including a sleeve and a core for the sleeve having a head to expand the leading end of the sleeve into a rivet head, by longitudinal movement of the core, after the leading end of the sleeve has been inserted through a hole.

An important object of the invention is to provide a more secure fastener of said expansible type.

Other objects of the invention will appear hereinafter.

In the drawing, Fig. 1 is a group view, showing the elements of the fastener prior to assembly;

Fig. 2 an enlarged fragmentary section on the line 2—2 of Fig. 1;

Fig. 3 is an enlarged sectional view on the line 3—3 of Fig. 1;

Fig. 4 a longitudinal sectional view of the fastener, showing it forced through registering holes in parts to be joined, and prior to the forming of the rivet heads;

Fig. 5 a view similar to Fig. 4 showing the fastener tightened, with the rivet heads formed;

Fig. 6 a view similar to Fig. 4 showing a modified form of the fastener;

Fig. 7 a view similar to Fig. 5, showing said fastener of modified form tightened;

Fig. 8 a section on the line 8—8 of Fig. 5, or of Fig. 7; and

Fig. 9 a view similar to Fig. 5 showing the nut and bolt elements removed, to leave a fastener of eyelet form.

Referring first to the form of the invention illustrated in Figs. 1 to 7 inclusive, the fastener includes a bolt 1, a sleeve 2, and a nut 3. The bolt forms a core for the sleeve, and the ends of the sleeve and the bolt head and the nut are formed to cooperate to expand the sleeve ends into rivet heads. The shank of the bolt is formed to positively lock in the sleeve against rotation, and the periphery of the sleeve is formed to positively lock against rotation in a hole which receives it, as will be described more particularly hereinafter.

The shank of the bolt 1 has a head 4 at one end. Its opposite end is reduced in diameter and has a screw thread 5. Between the head and the screw thread the shank is corrugated to form straight, parallel, longitudinal ribs or splines 6. Said splines and the grooves therebetween are approximately V-shaped in cross section and they preferably extend from a point adjacent the bolt head to a point at, or closely adjacent to the thread. They are uniformly spaced entirely around the bolt shank and may be formed on a cylindrical blank portion of the shank by rolling, cutting or otherwise. Their crests protrude radially beyond the crest of the screw thread. Adjacent the thread, the ends of the splines may be beveled as shown. The bolt head has an inwardly tapering frusto-conical base portion 7 and a portion 8 having a circular peripheral face tapering outward slightly. Between the bolt head and the splines 6 the shank may form a short neck, as shown.

The sleeve 2 has its periphery corrugated to form straight, parallel longitudinal splines 9 extending the full length of the sleeve and uniformly spaced entirely around the sleeve. Said splines and the grooves therebetween are substantially V-shaped in cross section and of uniform depth. The crests and roots of the splines lie on concentric cylinders. The splines may be rolled, cut or otherwise formed on a blank sleeve. The bore or passage in the sleeve has a medial portion 10 of smooth cylindrical form, and outwardly flaring end portions 11 of frusto-conical form, the flare preferably extending clear to the crests of the splines at the ends of the latter. This gives the ends of the splines an internal bevel and also affords clearance for entrance of the bore of the nut and the base of the bolt head. The ends of the sleeve may be slit at several points therearound, as at 12, to facilitate expansion of the sleeve ends.

The nut 3 has a tapered annular base or abutment portion 13 for expanding one of the sleeve ends. Said base portion is counter-bored at its center to form a recess 14 of a diameter sufficient to permit entry of the adjacent ends of the bolt splines into the recess. The recess permits the nut to be screwed fully home without obstruction by the splines or by an imperfect end portion of the bolt thread.

The bolt thread 5 and the nut thread, designated 15, are of the well-known Dardelet type of screw threads disclosed in United States Patent No. 1,657,244. The crest of the nut thread and the root of the bolt thread slope inward and make an angle of preferably six degrees with the thread axis, this being within the angle of friction of the metal or metals of the threads. The ribs of the threads are narrower than the grooves to permit substantial relative crosswise displacement upon screw-tightening rotation of one thread on the other without axial advance. By said crosswise displacement the threads are interwedged, the sloping crest surface of the nut thread and the sloping root surface of the bolt thread being forced into mutual frictional, self-locking engagement.

The threads also have opposed, coacting abutment surfaces disposed at an abrupt angle to the thread axis to positively limit said crosswise displacement.

The diameter of the cylindrical portion 10 of the sleeve bore exceeds the maximum diameter of the threaded end of the bolt and is in extent intermediate the maximum and minimum diameters of the circular series of bolt splines 6. The maximum diameter of the bolt head is in extent intermediate the maximum and minimum diameters of the series of splines 9 around the periphery of the sleeve.

In the assembly of the fastener parts, the threaded end of the bolt is inserted freely into the bore of the sleeve and then the splined portion is driven through the reduced cylindrical portion of the bore, the sharp crests of the splines penetrating the sleeve entirely around the bolt, as shown in Fig. 8. Thereby the bolt is positively locked to the sleeve against rotation therein. The bolt shank is driven through the sleeve until the bolt head is brought to bear against the adjacent flared portion of the sleeve bore, but without expanding the end of the sleeve. The bolt is materially longer than the sleeve and most of the threaded end portion of the bolt protrudes from the sleeve. The nut is screwed on the bolt until its tapered base bears against the adjacent end of the sleeve, but without expanding the latter.

The fastener, so assembled, is applied as follows: The bolt head is inserted into one of a pair of registering holes in two parts P to be joined. Said holes should be of a diameter less than the maximum diameter of the splined portion of the bolt and approximately equal to the maximum diameter of the bolt head. The tapering portion 8 of the head protrudes from the leading end of the sleeve to enter the holes in advance of the latter and accurately center the sleeve with respect to the holes. By either impact or sustained pressure on the nut, the entire fastener is moved to force the sleeve through the holes. The portions of the sleeve splines projecting radially beyond the bolt head penetrate the walls of the hole entirely around the sleeve, as shown in Fig. 8. Thereby the sleeve is positively locked against rotation in the holes. The length of the sleeve will be such in relation to the thickness of the parts P that when the sleeve is forced fully into place both ends of the sleeve will protrude to a depth as great as the depth of the flare of the sleeve bore. When the sleeve is in place the nut is screwed home causing the tapered base of the nut and the tapered base of the bolt head to expand the sleeve ends and form them into rivet heads by contraction of the nut and the bolt head toward each other.

In the final tightening rotation of the nut, without axial advance, the bolt and nut threads are interwedged, as previously described, to lock against accidental unscrewing. The sleeve is positively locked against rotation in the holes and the bolt is positively locked against rotation in the sleeve. Thereby the bolt is positively locked against rotation with relation to the parts P. This enables the nut to be screwed on fully and tightly locked, without holding the bolt head. Also, by prevention of relative rotation of the different elements in the finished joint the thread lock is safeguarded. Thereby a joint of maximum security is obtained.

Figs. 6 and 7 illustrate a fastener similar in all essentials to the one just described except that it is designed to expand the leading end only of the sleeve into a rivet head. The opposite end of the sleeve is flat and the abutment face of the nut is flat and is adapted to bear against the sleeve end and against the adjacent joined part P. An advantage in this structure is that the joint may be opened by removing the nut from the bolt and driving the bolt and sleeve forward through the hole.

In structures where light weight is a requirement the joint shown in Fig. 5 may be readily converted into a simple eyelet form of joint by removing the nut and driving the bolt out of the sleeve. Such an eyelet joint is shown in Fig. 9. Only the headed sleeve of the fastener remains and the weight of the joint is therefore greatly reduced.

The sleeve will preferably be made of a metal slightly harder than that of the parts P, and the bolt will preferably be made of a metal slightly harder than that of the sleeve so that the sleeve splines will penetrate the metal of the joined parts and the bolt splines will penetrate the metal of the sleeve.

What I claim is:

1. A fastener comprising a sleeve longitudinally corrugated on its periphery to bind in a hole and lock the sleeve against rotation therein, the bore of the sleeve being flared at its ends, a bolt whose shank exceeds the sleeve in length and has a head of less diameter than the corrugated periphery of the sleeve and a reduced screw threaded end portion and an intermediate portion to form a core for the sleeve and the periphery of which is longitudinally corrugated to lock the bolt in the sleeve against rotation, and a nut for the threaded end of the bolt, said nut and said bolt head having tapered base portions to enter the flared ends of the sleeve bore and expand the sleeve ends to form rivet heads.

2. A fastener comprising a sleeve longitudinally corrugated on its periphery to bind in a hole and lock the sleeve against rotation, the bore of the sleeve being flared at one end, a bolt whose shank exceeds the sleeve in length and has a head of less diameter than the corrugated periphery of the sleeve and a reduced screw threaded end portion and an intermediate portion to form a core for the sleeve and the periphery of which is longitudinally corrugated to lock the bolt in the sleeve against rotation, and a nut for the threaded end of the bolt, said bolt head having a tapered base portion to enter said flared end of the sleeve bore and expand the sleeve end to form a rivet head.

3. A fastener comprising a sleeve having a rough peripheral surface to bind in a hole and lock the sleeve against rotation therein, a bolt whose shank exceeds the sleeve in length and has a head and a reduced screw threaded end portion and an intermediate portion to form a core for the sleeve, means to positively lock the bolt against rotation in the sleeve, and a nut for the threaded end of the bolt, the bolt head and the adjacent end of the sleeve being formed to cooperate to expand said sleeve end into a rivet head.

4. A fastener comprising a sleeve having a rough peripheral surface to bind in a hole and lock the sleeve against rotation therein, the bore of the sleeve being flared at one end, a bolt whose shank exceeds the sleeve in length and has a head and a reduced screw threaded end portion and an intermediate portion to form a core for the sleeve and the periphery of which is roughened to lock the bolt in the sleeve against rotation, and a nut for the threaded end of the bolt, said bolt head having a tapered base portion to enter said flared end of the sleeve bore and expand the sleeve end to form a rivet head.

5. A fastener comprising a sleeve having longitudinal splines arranged around its periphery and tapering toward their crests in cross section to bind in a hole and lock the sleeve against rotation therein, a bolt whose shank exceeds the sleeve in length and has a head and a reduced screw threaded end portion and an intermediate portion to form a core for the sleeve and the periphery of which has longitudinal splines therearound to lock the bolt in the sleeve against rotation, and a nut for the threaded end of the bolt, said bolt head being formed to expand one of the sleeve ends to form a rivet head when the nut is screwed home at the opposite end of the sleeve.

6. A fastener as claimed in claim 5, characterized in that the screw thread on the bolt shank and the screw thread on the nut are self-locking threads which are crosswisely displaceable and frictionally interwedge upon tightening rotation of the nut without axial advance.

7. A fastener comprising, in combination, a sleeve for driving into a hole and having longitudinal splines arranged in a circular series around its periphery and tapering toward their crests in cross section to lock the sleeve against rotation in the hole, a portion of the bore of the sleeve flaring outward to said splines at the leading end of the sleeve, a bolt whose shank extends through the bore of the sleeve and has a reduced screw threaded end portion protruding from the opposite end of the sleeve, and a circular head protruding from the leading end of the sleeve and of a maximum diameter intermediate the maximum and minimum diameters of the circular series of splines at the leading end of the sleeve, to enter the hole in advance of the sleeve and center the latter with respect to the hole, means positively locking the bolt against rotation in the sleeve and a nut for said screw threaded portion of the bolt shank, the bolt head having a tapered base portion to engage said flared portion of the sleeve bore and expand the leading end of the sleeve into a rivet head.

8. A joint structure wherein opposed joined parts having registering holes are clamped by a bolt and a nut, the shank of which bolt extends through said holes and is provided with a head at one end and with a screw threaded portion at its opposite end upon which threaded portion the nut is screwed, characterized in that a sleeve surrounds the bolt shank and extends through said holes and has its ends expanded into rivet heads by the bolt head and the nut, splines positively lock said sleeve against rotation in said holes, splines positively lock the bolt shank against rotation in the sleeve, and the screw threads of the bolt and nut have coacting root and crest locking surfaces sloping slightly with reference to the bolt axis and forced into mutual self-locking engagement to lock the nut against unscrewing.

9. A joint structure wherein opposed joined parts having registering holes are clamped by a bolt and a nut, the shank of which bolt extends through said holes and is provided with a head at one end and with a screw-threaded portion at its opposite end upon which threaded portion the nut is screwed, characterized in that a sleeve surrounds the bolt shank and extends through said holes and has one end expanded into a rivet head by the bolt head, means are provided positively locking said sleeve against rotation in said holes, and means are provided positively locking the bolt shank against rotation in the sleeve.

ALFRED MORRIS THOMSON.